(12) United States Patent
Sasaki (10) Patent No.: US 6,799,082 B2
(45) Date of Patent: Sep. 28, 2004

(54) PROCESS CONTROL METHODS AND APPARATUS

(75) Inventor: Takashi Sasaki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 343 days.

(21) Appl. No.: 09/906,500

(22) Filed: Jul. 16, 2001

(65) Prior Publication Data
US 2002/0043353 A1 Apr. 18, 2002

(30) Foreign Application Priority Data
Sep. 1, 2000 (JP) ........................................ 2000-265336

(51) Int. Cl.$^7$ ................................................. G06F 7/66
(52) U.S. Cl. ........................ 700/128; 700/129; 162/262
(58) Field of Search ................................ 700/127, 128, 700/129, 54; 162/198, 262, 263

(56) References Cited

U.S. PATENT DOCUMENTS 4,755,924 A * 7/1988 Hiroi ........................... 700/54
5,111,124 A * 5/1992 Kurosawa ..................... 318/434
5,121,332 A * 6/1992 Balakrishnan et al. ....... 700/127
5,195,028 A * 3/1993 Hiroi ............................ 700/41
6,026,334 A * 2/2000 Kayihan et al. .............. 700/28
6,505,085 B1 * 1/2003 Tuttle et al. .................. 700/28

* cited by examiner

Primary Examiner—Leo Picard
Assistant Examiner—Alexander Kosowski
(74) Attorney, Agent, or Firm—Moonray Kojima

(57) ABSTRACT

The present invention provides a method for controlling a process by inputting a deviation between setpoint and process variables to a controller to calculate a controlled/manipulated variable, and then inputting the controlled/manipulated variable to the process, wherein conditions for the process variable to settle within a finite length of time are determined from the final-value theorem, the transfer function of the controller is derived from the conditions, and the value of or change in the controlled/manipulated variable with which to control the process is calculated using the transfer function. With this control method and apparatus for the method, it is possible to allow even a process with a long dead time and a large time constant to settle within a short length of time.

10 Claims, 9 Drawing Sheets

FIG.9
(a) NOZZLE 77

FIG.9
(b) NOZZLE 5

FIG.9
(c) NOZZLE 21

FIG.10

(a) BEFORE THE START OF CONTROL

FIG.10

(b) RIGHT AFTER THE START OF CONTROL

FIG.11

(c) 13 MINUTES AFTER THE START OF CONTROL

FIG.11

(d) 19 MINUTES AFTER THE START OF CONTROL

FIG.12

(e) 27 MINUTES AFTER THE START OF CONTROL

FIG.12

(f) WHEN CONTROL IS STABILIZED

FIG.13

(a) NOZZLE 75

(b) NOZZLE 80

PROCESS CONTROL METHODS AND APPARATUS

BACKGROUND OF THE INVENTION

1. Field of the Invention

Profile control in the cross-machine direction of a paper machine involves a long dead time and a large time constant. As a result, this type of control takes a long time to stabilize for such events as a setpoint change, thus decreasing production efficiency. Another problem has been that a manipulated variable may overshoot after paper threading due to sheet break or after grade change. As a result, the manipulated variable takes a long time to settle, thereby also decreasing production efficiency.

The present invention relates to a process control method based on a finite settling-time response method. More particularly, the invention relates to a process control method and a process control apparatus preferred in controlling paper thickness profiles in the cross-machine direction of a paper machine.

2. Description of the Prior Art

Figure 1:
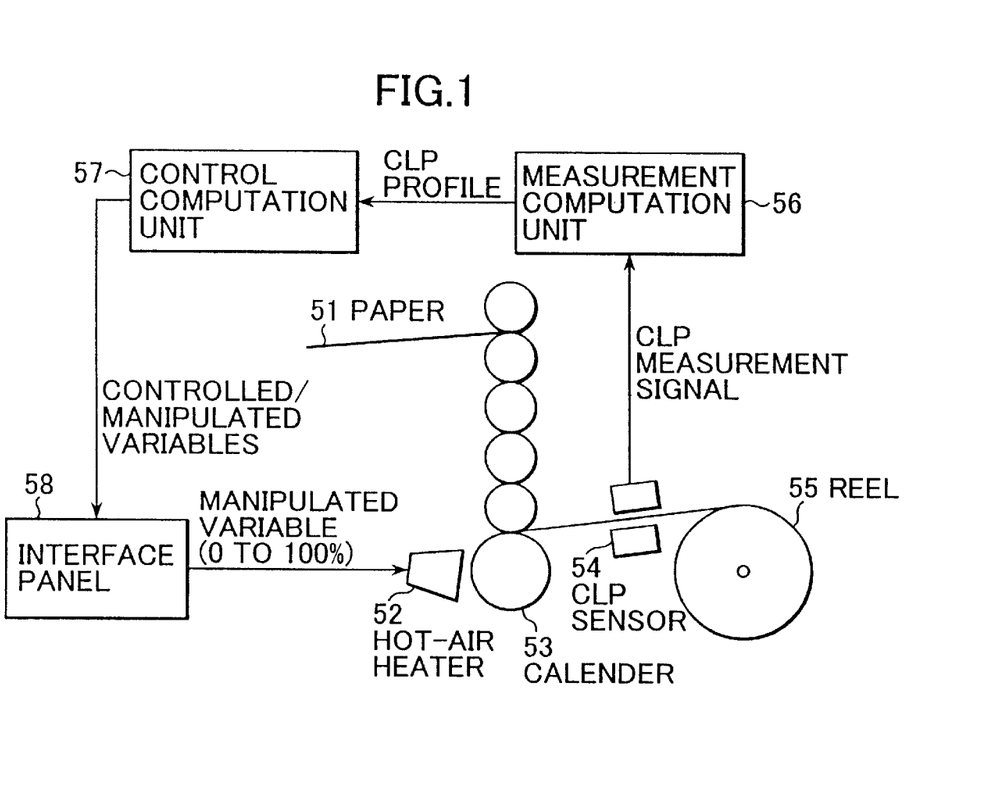
FIG. 1 is a diagrammatic view showing the configuration of a paper machine.

FIG. 1 is a diagrammatic view showing the configuration of a system for controlling the paper thickness (CLP) profiles of a paper machine. In the figure, produced paper 51 is smoothed in its entirety and tuned in its thickness profile by a calender 53, and wound onto a reel 55. At this point, the thickness profile in the cross-machine direction of the produced paper 51 is measured by a CLP sensor 54 placed immediately before the reel 55. The CLP sensor 54 repeats a scan (round travel) across the paper 51 in the cross-machine direction at a speed of approximately 30 seconds per one-way travel, thus measuring the thickness profile of the paper 51.

A CLP measurement signal, which is the output of the CLP sensor 54, is input to a measurement computation unit 56, where the CLP measurement signal is converted to a digital signal at a maximum speed of approximately 60 Hz. Thus, a maximum of 1200 items of measured CLP data is obtained for each one-way travel. Such a collection of CLP measurement signals as acquired for each one-way travel is referred to as a CLP profile. The CLP profile is regarded as representing the cross-section of the paper 51 in the cross-machine direction, and used for the purpose of paper quality control. The CLP profile is considered especially important in the case of printing paper. For example, the quality of newspaper is stipulated such that a variable R, which is the deviation between the maximum and minimum variances in paper thickness, be kept at or below 1 $\mu$m for an average paper thickness of 80 $\mu$m.

The CLP profile is input to a control computation unit 57, where a controlled/manipulated variable for controlling a hot-air heater 52 is calculated. This controlled/manipulated variable is input through an interface panel 58 to the hot-air heater 52. The hot-air heater 52 blows air as hot as 40 to 400° C. onto a calender 53 in order to change the diameter thereof by means of thermal expansion, thereby tuning the CLP profile. The heater is segmented into multiple zones at a spacing interval of 75 to 100 mm and the temperature setpoint of hot air is changed on a zone-by-zone basis, so that the diameter of the calender 53 in the cross-machine direction is varied and thereby the CLP profile is properly adjusted.

Figure 2:
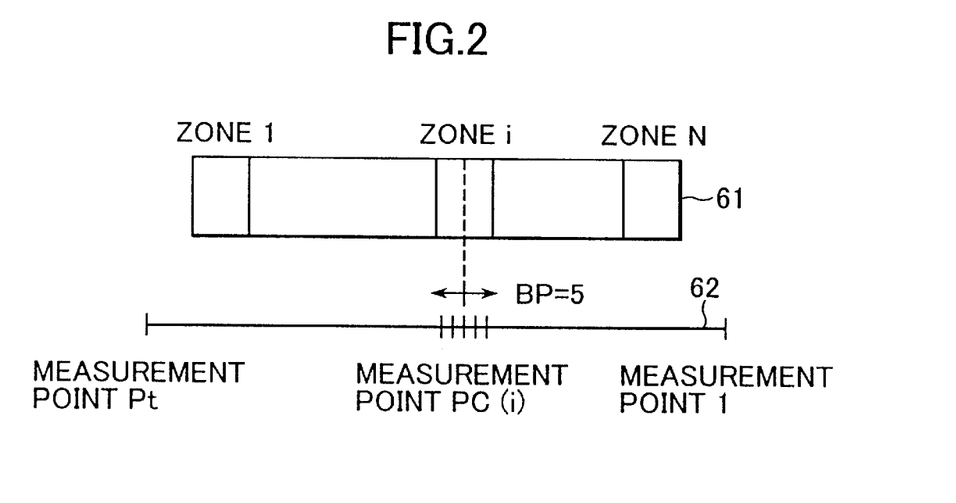
FIG. 2 is a schematic view explaining how a width of paper is divided into multiple zones.

Now, zone-specific profiles used in CLP profile control will be explained with reference to FIG. 2. In the figure, a numeral 61 indicates paper, the width thereof being divided into N zones. A numeral 62 indicates the measurement points of paper thickness, which amount to $P_t$ points. Since the number of measurement points is greater than the number of zones under normal conditions, a plurality of measurement points are allocated to each zone. FIG. 2 shows that five measurement points are allocated to each zone. Although dependent on the scale of a paper machine, N has a value from 50 to 100 in normal applications. Likewise, $P_t$ has a value of 1200 at the largest, though this value depends on the length of frame used.

A CLP profile PRF(i) is the value obtained by subtracting the average of all the values of a CLP process variable RPV(i) from the value of the CLP process variable RPV(i) of each measurement point. Thus, the CLP profile PRF(j) is expressed as equation 1 below.

$$PRF(i) = RPV(i) - PV_{AVE}(i=1, \ldots, Pt) \quad (1)$$

where $$PV_{AVE} = \frac{1}{Pt} \sum_{j=1}^{Pt} RPV(i)$$

A measurement point of a CLP profile positioned at the midpoint of an ith zone is referred to as the position-specific measurement point of that zone, and is represented as PC(i). The number of measurement points included in one zone is determined from the mechanical width of the hot-air heater and the spacing between the measurement points of paper thickness, and is represented as AP. By way of simplifying later discussion, AP is defined as an odd number. If any calculated value of AP happens to be even, 1 is added to the value to make it odd.

The zone-specific CLP profile of a zone i is defined as ZP(i), and expressed as equation 2 below.

$$ZP(i) = \frac{1}{AP} \sum_{j=-BP}^{BP} PRF(PC(i) + j) \quad (2)$$

where i=1, . . . , N

PC(i)=Position-specific measurement point of ith zone $$BP = \frac{AP - 1}{2}$$

CLP profile control refers to the type of control wherein a hot-air heater is controlled so that the CLP profile ZP(i) of each zone is flattened as much as possible.

Next, CLP profile control will be explained with reference to FIG. 3. The input to a controller 71 is a paper thickness deviation variable E(s), where a manipulated variable W(s) is calculated and output. The manipulated variable W(s) is input through a hold unit 72 to a process 73. The output of the process 73 is paper thickness C(s), which is fed back to the controller 71. G(s), H(s) and P(s) denote the transfer functions of the controller 71, hold unit 72 and process 73, respectively.

The transfer function P(s) of the process 73 can be approximated using a combination of a dead time and a first-order delay. Process measurement carried out in a certain paper machine using a step response method results in the dead time=5 min, time constant=8 min, and process gain=0.1 $\mu$m/%.

In order to carry out such control as described above, a sampling PI control method has been used conventionally. More specifically, it has been the common practice of such control to calculate a change in the controlled/manipulated variable $\Delta W_n(i)$ using equation 3 below.

$$\Delta W_n(i) = \frac{100}{PB}\left(\Delta E_n(i) + \frac{TC}{TI} \times E_n(i)\right) \quad (3)$$

where $\Delta W_n(i)$=Change in the manipulated variable of ith zone (%)

$\Delta E_n(i) = E_n(i) - E_{n-1}(i)$ $E_n(i)$=Zone-specific CLP profile of ith zone $E_{n-1}(i)$=Zone-specific CLP profile of ith zone measured one control period earlier TC=Control period, i.e., time required for a one-way travel of scan (sec)

PB=Proportional band (%)

TI=Integral time (sec)

Figure 4:
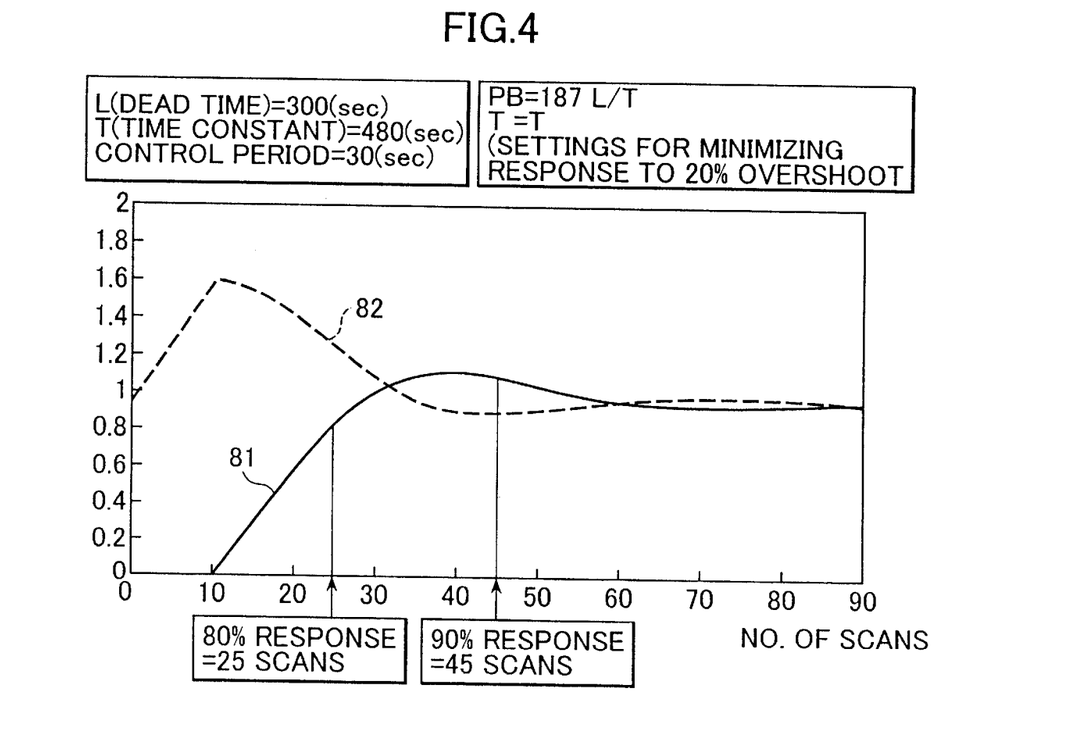
FIG. 4 is a graph showing the characteristics of prior art sampling PI control.

FIG. 4 shows the result of simulating the response of the process to a steplike disturbance, using the Chien-Hrones-Reswick method which is a typical method for determining a PI gain from a step response. The horizontal axis represents time in units of a control period (number of scans). Note that in this simulation, we defined the dead time L as 300 sec, time constant T as 480 sec, proportional band as 167×L/T, and integral time TI as T. This combination of settings minimizes the response to 20% overshoot. In FIG. 4, a numeral 81 indicates a control deviation variable and a numeral 82 denotes a change in the manipulated variable. As is evident from the figure, the process requires as many as 25 scans (750 sec) for 80% response and as many as 45 scans (1350 sec) for 90% response. This means that the process has extremely poor response.

SUMMARY OF THE INVENTION

The present invention is intended to provide a highly responsive method of control based on a finite settling-time response method. More specifically, the invention provides a method for controlling a process by inputting a deviation between setpoint and process variables to a controller to calculate a controlled/manipulated variable, and then inputting the controlled/manipulated variable to the process, wherein conditions for the process variable to settle within a finite length of time are determined from the final-value theorem, the transfer function of the controller is derived from the conditions, and the value of or change in the controlled/manipulated variable with which to control the process is calculated using the transfer function. As a result, it is possible to allow even a process with a long dead time and a large time constant to settle within a short length of time, thereby increasing the efficiency of production.

DETAILED DESCRIPTION OF THE PREFERRED EMBODIMENTS

Now, embodiments of the present invention will be described in detail with reference to the accompanying drawings.

Figure 3:
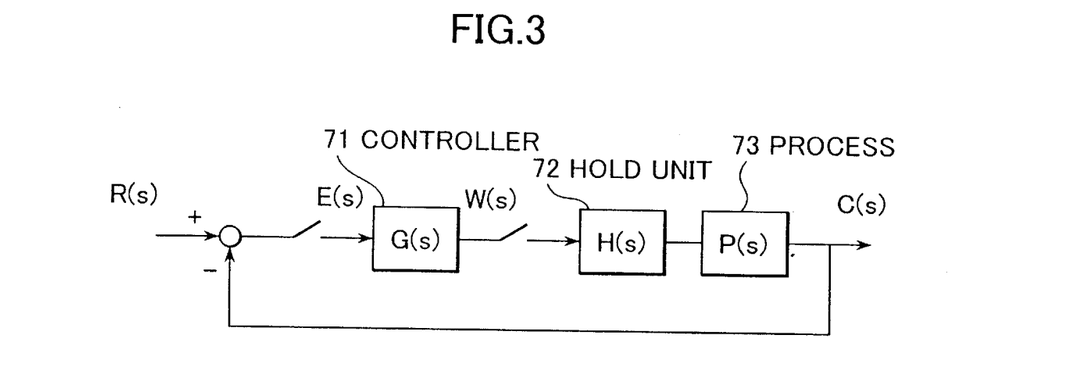
FIG. 3 is a block diagram showing the configuration of a control system used in a prior art paper machine.
Figure 5:
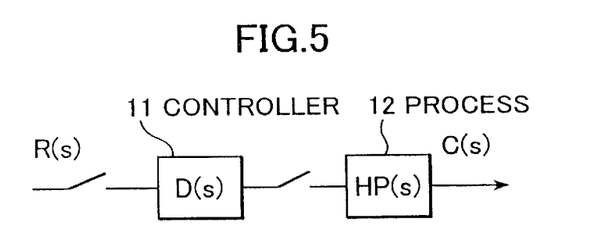
FIG. 5 is a block diagram showing how a feedback control system is changed into an open-loop control system.

FIG. 5 is a block diagram showing the result of changing the closed-loop control system of FIG. 3 by redrawing, into an open-loop control system. In FIG. 5, a paper thickness setpoint variable R(s) is input to a controller 11 having a transfer function D(s). The output of the controller 11 is in turn input to a process 12 having a transfer function HP(s). From the process 12, actual paper thickness C(s) is output. Now, the derivation of the block diagram of FIG. 5 will be explained.

The transfer function H(s) of the hold circuit 72 in FIG. 3 is represented by equation (4) below.

$$H(s) = \frac{1 - e^{-Ts}}{s} \quad (4)$$

where

T=Sampling interval

Since the process 73 can be represented using a dead time and a first-order delay as discussed earlier, the transfer function P(s) of the process 73 is expressed by equation (5) below.

$$P(s) = \frac{Ke^{-Ls}}{1 + T_0 s} \quad (5)$$

where $T_0$=Time constant

L=Dead time defined as L=m*T (m is 0 or a natural number)

From FIG. 3,

E(s)=R(s)−C(s)

W(s)=G(s)E(s)

C(s)=HP(s)W(s)

hold true. By rearranging these equations, we obtain

−HP(s)G(x)C(s)+HP(s)G(x)R(s)=C(s)

By rearranging this equation for C(s), we obtain $$C(s) = \frac{HP(s)G(x)}{1+HP(s)G(x)}R(s)$$

By comparing this equation with the block diagram of FIG. 5 and defining D(z) as $$D(z) = \frac{G(s)}{1+HP(s)G(s)}$$

we see that the block diagram of FIG. 3 can be changed to that of FIG. 5.

Next, we will z-transform the process 12 shown in FIG. 5.

By substituting equations (4) and (5) for the H(s) and P(s) terms in the above-noted equation and z-transforming the result, we obtain equation (6) below.

$$\begin{aligned} HP(z) &= Z\left[\frac{1-e^{-Ts}}{s} \cdot \frac{Ke^{-Ls}}{1+T_0s}\right] \quad (6) \\ &= K(1-z^{-1})z^{-m} \cdot Z\left[\frac{1}{s(1+T_0s)}\right] \\ &= K(1-z^{-1})z^{-m} \cdot Z\left[\frac{1}{s} - \frac{1}{s+T_0^{-1}}\right] \\ &= K(1-z^{-1})z^{-m}\left(\frac{1}{1-z^{-1}} - \frac{1}{1-e^{-T/T_0}z^{-1}}\right) \\ &= \frac{K(1-\alpha)z^{-(m+1)}}{1-\alpha z^{-1}} \end{aligned}$$

where $$\alpha = e^{-T/T_0}$$

Figure 6:
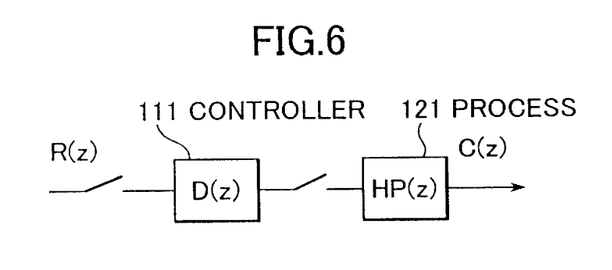
FIG. 6 is a block diagram showing the result of z-transforming the control system of FIG. 5.

As the result of this transform, the controller 11 and process 12 of FIG. 5 are changed to a controller 111 and a process 121, respectively, as shown in FIG. 6.

In FIG. 6, the necessary and sufficient conditions for C(z) to be able to settle finitely in the settling time of (k+m)T (k is a natural number) are that equations 7 and 8 hold true for a given set of values $a_1, a_2, \ldots, a_{k-1}, a_k$ and $A_0$, according to the final-value theorem, as shown below.

$$D(z) = A_0(1-\alpha z^{-1})\{1+\alpha_1 z^{-1} + \alpha_2 z^{-2} + \ldots + \alpha_{k-1} z^{-(k-1)}\} \quad (7)$$

$$\lim_{Z \to 1} A_0 K(1-\alpha)z^{-(m+1)}\{1+a_1 z^{-1}+a_2 z^{-2}+\ldots+a_{k-1}z^{-(k-1)}\} = 1 \quad (8)$$

From equation (8), we have $$A_0 = \frac{1}{K(1-\alpha)(1+a_1+a_2+\ldots+a_{k-1})}$$

By substituting this equation into equation (7), we obtain $$D(z) = \frac{(1-\alpha z^{-1})}{KA(1-\alpha)}\left\{1+\sum_{i=1}^{k-1}a_i z^{-i}\right\}, A=1+a_1+a_2+\cdots+a_{k-1}$$

Formulating G(z) from this equation gives equation 9 below:

$$\begin{aligned} G(z) &= \frac{D(z)}{1-HP(z)D(z)} \quad (9) \\ &= \frac{\frac{(1-\alpha z^{-1})}{KA(1-\alpha)}\left\{1+\sum_{i=1}^{k-1}a_i z^{-i}\right\}}{1-\frac{K(1-\alpha)z^{-(m+1)}}{1-\alpha z^{-1}}\frac{(1-\alpha z^{-1})}{KA(1-\alpha)}\left\{1+\sum_{i=1}^{k-1}a_i z^{-i}\right\}} \\ &= \frac{1}{KA(1-\alpha)}\frac{(1-\alpha z^{-1})\left\{1+\sum_{i=1}^{k-1}a_i z^{-i}\right\}}{1-\frac{1}{A}z^{-(m+1)}\left\{1+\sum_{i=1}^{k-1}a_i z^{-i}\right\}} \end{aligned}$$

If we assume that $a_i = \alpha^i (1 \leq i \leq k-1)$, where $\alpha = e^{-T/T_0}$
T=Sampling interval
$T_0$=Process time constant then we obtain $$1+\sum_{i=1}^{k-1}a_i z^{-i} = 1+\sum_{i=1}^{k-1}\alpha^i z^{-i} = \sum_{i=0}^{k-1}\alpha^i z^{-i} = \frac{1-\alpha^k z^{-k}}{1-\alpha z^{-1}}$$

$$A = 1+\sum_{i=1}^{k}a_i = \sum_{i=0}^{k}\alpha^i = \frac{1-\alpha^k}{1-\alpha}$$

Consequently, equation (10) below holds true.

$$\begin{aligned} G(z) &= \frac{1}{K(1-\alpha^k)}\frac{1-\alpha^k z^{-k}}{1-\frac{1-\alpha}{1-\alpha^k}z^{-(m+1)}\frac{(1-\alpha^k z^{-k})}{1-\alpha z^{-1}}} \quad (10) \\ &= \left(\frac{1}{K(1-\alpha^k)}\right)\frac{(1-\alpha z^{-1})(1-\alpha^k z^{-k})}{(1-\alpha z^{-1})-\frac{(1-\alpha)}{1-\alpha^k}z^{-(m+1)}(1-\alpha^k z^{-k})} \end{aligned}$$

From equation (10), a control computation expression based on a finite settling-time response method is given by $$\begin{aligned} G(z) &= \frac{1}{K(1-\alpha^k)}\frac{(1-\alpha z^{-1})(1-\alpha^k z^{-k})}{(1-\alpha z^{-1})-\frac{1-\alpha}{1-\alpha^k}z^{-(m+1)}(1-\alpha^k z^{-k})} \\ &= \frac{1}{K(1-\alpha^k)}\frac{(1-\alpha z^{-1})(1-\alpha^k z^{-k})}{(1-\alpha z^{-1})-\frac{1-\alpha}{1-\alpha^k}z^{-(m+1)}(1-\alpha^k z^{-k})} \end{aligned}$$

Accordingly, the controlled/manipulated variable $W_n$ for a control timing n is given by $$W_n = \frac{1}{K(1-\alpha^k)}[E_n - \alpha E_{n-1} - \alpha^k\{E_{n-k} - \alpha E_{n-(k+1)}\}] + \quad (11)$$

$$\alpha W_{n-1} - \alpha W_{n-2} + \frac{1-\alpha}{1-\alpha^k}\{W_{n-(m+1)} - \alpha^k W_{n-(m+k+1)}\}$$

$$W_{n-1} = \frac{1}{K(1-\alpha^k)}[E_{n-1} - \alpha E_{n-2} - \alpha^k\{E_{n-(k+1)} - \alpha E_{n-(k+2)}\}] +$$

$$\alpha W_{n-2} - \alpha W_{n-3} + \frac{1-\alpha}{1-\alpha^k}\{W_{n-(m+2)} - \alpha^k W_{n-(m+k+3)}\}$$

By rewriting equations (11) to represent a change in the controlled/manipulated variable, $\Delta wW_n$, we obtain equation (12) below:

$$\Delta W_n = \frac{1}{K(1-\alpha^k)}[E_n - (\alpha+1)E_{n-1} + \alpha E_{n-2}] - \qquad (12)$$
$$\frac{\alpha^k}{K(1-\alpha^k)}[E_{n-k} - (\alpha+1)E_{n-(k+1)} + \alpha E_{n-(k+2)}] +$$
$$\alpha \Delta W_{n-1} + \frac{1-\alpha}{1-\alpha^k}\{\Delta W_{n-(m+1)} - \alpha^k \Delta W_{n-(m+k+1)}\}$$
$$= \frac{1}{K(1-\alpha^k)}[E_n - (\alpha+1)E_{n-1} + \alpha E_{n-2} -$$
$$\alpha^k\{E_{n-k} - (\alpha+1)E_{n-(k+1)} + \alpha E_{n-(k+2)}\}] +$$
$$\alpha \Delta W_{n-1} + \frac{1-\alpha}{1-\alpha^k}\{\Delta W_{n-(m+1)} - \alpha^k \Delta W_{n-(m+k+1)}\}$$

Consequently, it is possible to improve response by carrying out control using the change in the controlled/manipulated variable, $\Delta W_n$ based on equation (12).

In CLP profile control, a manipulated variable often overshoots beyond the 0–100% range, thus causing a deterioration in controllability. In the paragraphs that follow, a control algorithm is proposed that allows a process to settle within a finite length of time even in that case.

Now we define the upper limit of manipulation with a fixed setpoint as L (positive) and an actual manipulated variable as $\Delta w_n^a$. If $W_n + \Delta W_n > L$, then $\Delta w_n^a = L - W_n$ holds true, provided that $W_n$ and $\Delta W_n$ are given by equations (11) and (12), respectively. This means that only part of the sum $(W_n + \Delta W_n)$ can be provided as an output.

Therefore, if we define the amount of change in the manipulated variable, $\Delta w_n$, which could not be output, as $\Delta w_n^b$, then the following relationship holds true.

$$\Delta W_n^b = \Delta W_n - \Delta W_n^a = \Delta W_n - (L - W_n) \qquad (13)$$

This relationship also holds true for the lower limit of manipulation.

If we change equation (13) into $$\Delta W_n = \Delta W_a^n + \Delta W_n^b$$

and substitute this relationship into equation (12), we obtain $$\Delta W_n^a + \Delta W_n^b = \frac{1}{K(1-\alpha^k)}[E_n - (\alpha+1)E_{n-1} + \qquad (14)$$
$$\alpha E_{n-2} - \alpha^k\{E_{n-k} - (\alpha+1)E_{n-(k+1)} + \alpha E_{n-(k+2)}\}] +$$
$$\alpha \Delta W_{n-1} + \frac{1-\alpha}{1-\alpha^k}\{\Delta W_{n-(m+1)} - \alpha^k \Delta W_{n-(m+k+1)}\}$$

Changing equation (14) results in $$\Delta W_n^a = \frac{1}{K(1-\alpha^k)}[\{E_n - K(1-\alpha^k)\Delta W_n^b\} - (\alpha+1)E_{n-1} + \qquad (15)$$
$$\alpha E_{n-2} - \alpha^k\{E_{n-k} - (\alpha+1)E_{n-(k+1)} + \alpha E_{n-(k+2)}\}] +$$
$$\alpha \Delta W_{n-1} + \frac{1-\alpha}{1-\alpha^k}\{\Delta W_{n-(m+1)} - \alpha^k \Delta W_{n-(m+k+1)}\}$$

From equation (15), we can regard $\Delta w_n^a$ as the manipulated variable of a finite settling time controller $G_c$ for a deviation $E_n^b$, if we define $E_n^b$ as $$E_n^b = E_n - KA(1-\alpha)\Delta W_n^b$$

In this case, $w_n + \Delta w_n^a = L$ holds true. Accordingly, there is no need to consider the manipulation limit L. This means that any given control deviation can be regarded as $E_n^b$, rather than an actual deviation $E_n$. Thus, we can consider the manipulated variable $\Delta w_n^a$ with a manipulation limit in the same way as we address a manipulated variable for which no manipulation limit is considered. For this reason we change equation (15) into equation (16) below.

$$\Delta W_n = \frac{1}{K(1-\alpha^k)}[E_n - (\alpha+1)\{E_{n-1} - K(1-\alpha^k)\Delta W_{n-1}^b\} + \qquad (16)$$
$$\alpha\{E_{n-2} - K(1-\alpha^k)\Delta W_{n-2}^b\}] -$$
$$\frac{\alpha^k}{K(1-\alpha^k)}[\{E_{n-k} - K(1-\alpha^k)\Delta W_{n-k}^b\} - (\alpha+1)$$
$$\{E_{n-(k+1)} - K(1-\alpha^k)\Delta W_{n-(k+1)}^b\} +$$
$$\alpha\{E_{n-(k+2)} - K(1-\alpha^k)\Delta W_{n-(k+2)}^b\}] +$$
$$\alpha \Delta W_{n-1}^a + \frac{1-\alpha}{1-\alpha^k}\{\Delta W_{n-(m+1)}^a - \alpha^k \Delta W_{n-(m+k+1)}^a\}$$

where $\Delta w_n^a = L - W_n$ (if $W_n + \Delta W_n > L$) or $\Delta w_n^a = \Delta W_n$ (if $W_n + \Delta W_n \leq L$), and $\Delta w_n^b = \Delta W_n - (L - W_n)$ (if $W_n + \Delta W_n > L$) or $\Delta w_n^b = 0$ (if $W_n + \Delta W_n \leq L$)

Thus, it is evident that a change in the manipulated variable given by equation (16) settles within a finite length of time.

Figure 7:
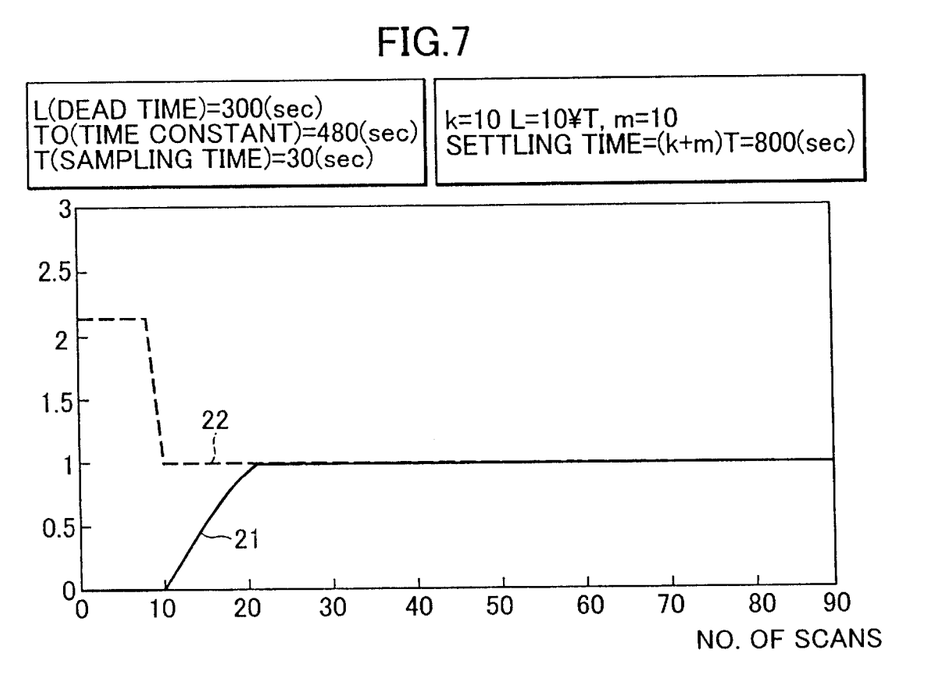
FIG. 7 is a graph showing the step-response characteristics of the control method according to the present invention.

FIG. 7 shows the result of simulating the response when a step disturbance is applied to the control computation expression defined as equation (12). In FIG. 7, a numeral 21 indicates a control deviation variable and a numeral 22 indicates a manipulated variable. Also note that the variable k in equations (7) and (8) noted earlier is assumed to be 10 here and, therefore, the settling time L+kT is 600 sec. Furthermore, like the case of FIG. 4, the simulation was carried out by defining the dead time as 300 sec, time constant as 480 sec, and sampling time as 30 sec.

As is evident from FIG. 7, the control deviation variable provides 100% response in as short as 20 scans (600 sec), which is a significant improvement when compared with the response of FIG. 4. Thus, use of a finite settling-time response method makes it theoretically possible to achieve 100% response that cannot be attained with sampling PI control.

Since the minimum value of k is 1, we assume here that k=1. Then, the shortest settling time is calculated as L+T= 330 sec. Note however that the initial value of the manipulated variable $\Delta w_1$ for a step disturbance is $$\Delta W_1 = $$
$$\frac{1}{K(1-\alpha^k)} = \frac{1}{1-\{\exp(-T/T_0)\}^k} = \frac{1}{1-\{\exp(-10/480)\}^k} = \frac{1}{1-0.979^k}$$

Thus, $\Delta w_1$ is calculated as $\Delta w_1 = 47.61 = 4761\%$. This value is not realistic at all. In practice, the value of k must be defined so as to satisfy $k \times T > T_0 / 2$ ($T_0$ is a time constant).

Figure 8:
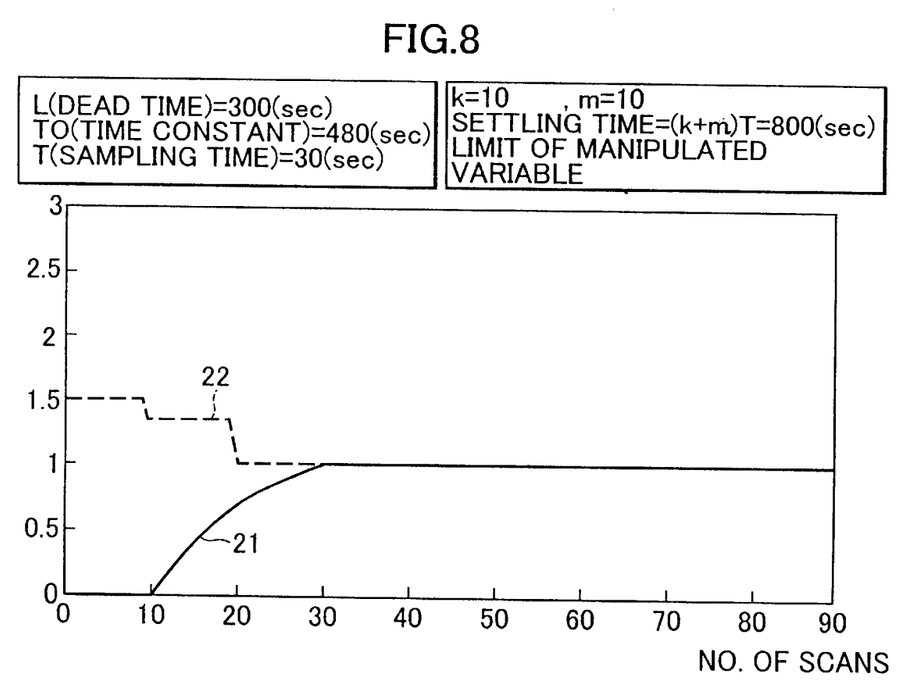
FIG. 8 is a graph showing step-response characteristics for a case where a manipulated variable overshoots.

FIG. 8 shows the result of simulating a step response when the upper limit of a manipulated variable is set to 1.5 (150%). If a change in the controlled/manipulated variable is calculated according to equation (12), the resulting value will cross this limit. For this reason, the manipulated variable is determined according to equation (16). Note that the conditions of this simulation, i.e., the dead time=300 sec, time constant=480 sec, sampling time=30 sec, and k=10, are the same as those of FIG. 7. In addition, m in equation (16)

is assumed to be 10 here. Consequently, a theoretical settling time is calculated as (k+m)T=600 sec. Also note that like the case of FIG. 7, a numeral 21 denotes a control deviation variable and a numeral 22 denotes a manipulated variable.

As is evident from FIG. 8, a change in the manipulated variable settles within a finite length of time also in this case, though the settling time is prolonged beyond 30 scans (600 sec). This means that the manipulated variable can be made to settle in a short length of time by calculating the manipulated variable according to equation (16), even if the theoretical value of the manipulated variable exceeds the controller's upper limit of the manipulated variable.

Figure 9:
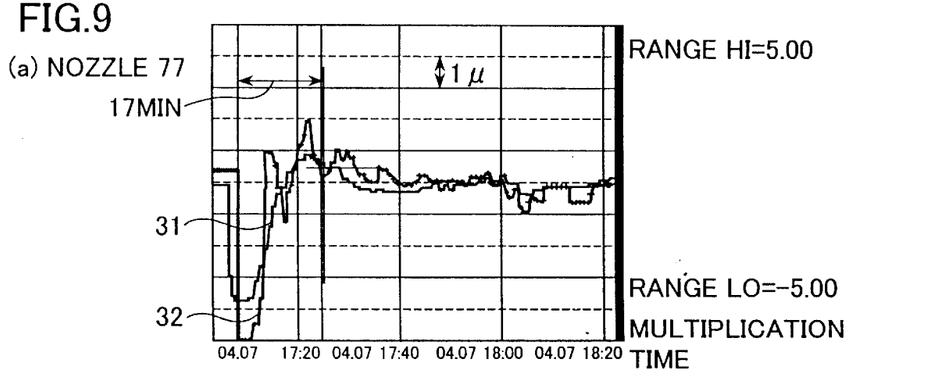
FIG. 9 is a graphical view showing response characteristics when the present invention is applied to an actual process.

FIG. 9 shows how actual control is carried out. This figure is a collection of trend graphs representing CLP profiles corresponding with nozzles 77, 5 and 21 and the manipulated variables of these respective nozzles. A numeral 31 indicates a CLP deviation variable ($\mu$m) and a numeral 32 indicates a manipulated variable (%). In all of graphs a to c, the CLP deviation variable is seen to settle within 0.5 $\mu$m in only 15 to 17 minutes. Graph c, among other graphs, is for a case where the manipulated variable has overshot toward the 0% side. Although somewhat slow in being pulled back, the CLP deviation variable settles to 0.5 $\mu$m in also as fast as 17 minutes.

Figure 10:
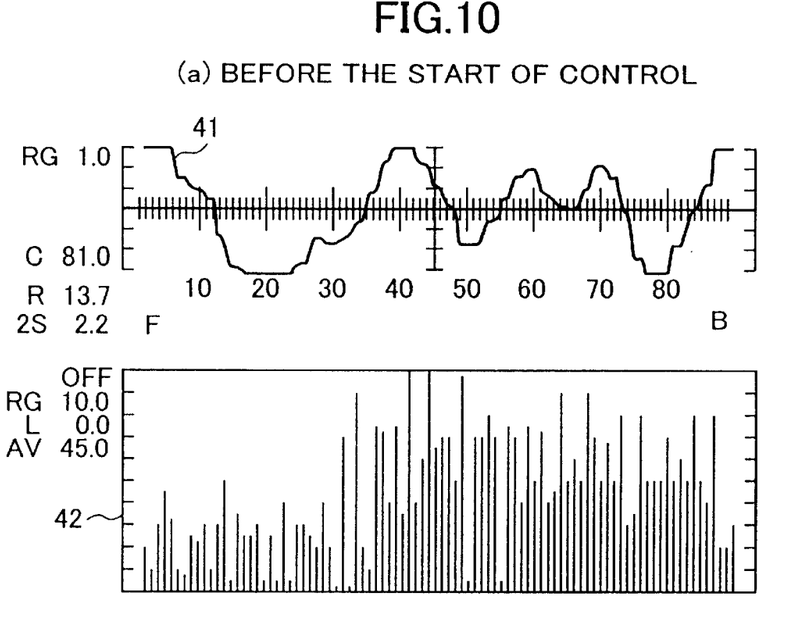
FIG. 10 is another graphical view showing response characteristics when the present invention is applied to an actual process.
Figure 11:
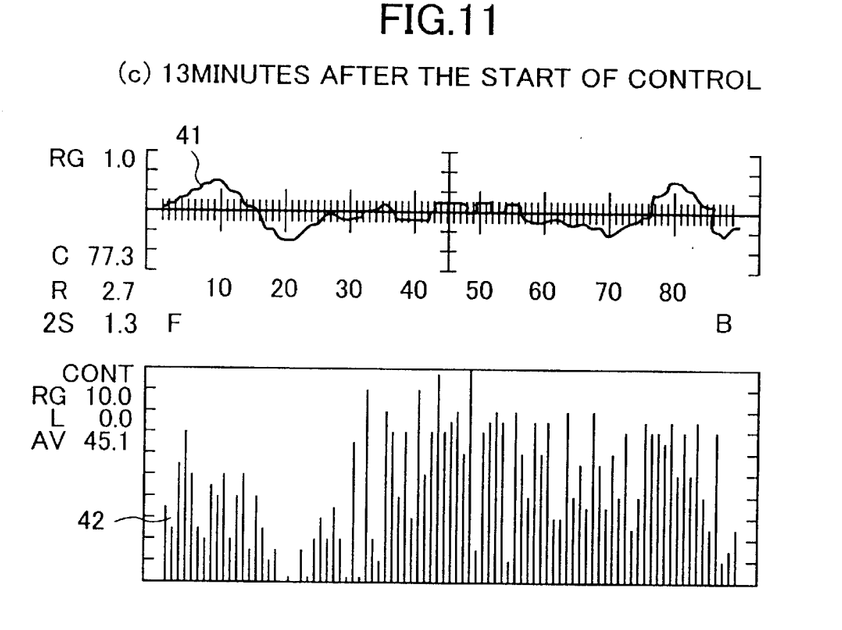
FIG. 11 is yet another graphical view showing response characteristics when the present invention is applied to an actual process.
Figure 12:
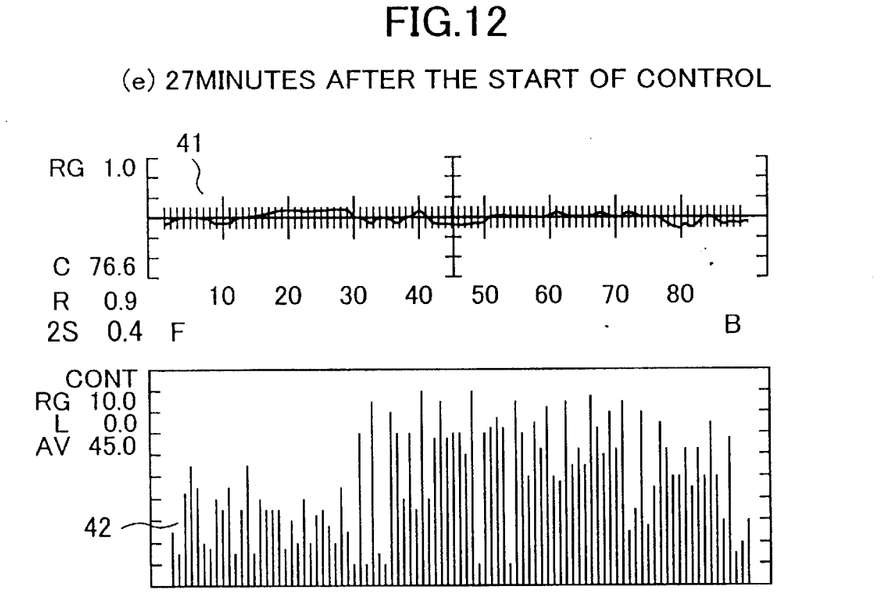
FIG. 12 is yet another graphical view showing response characteristics when the present invention is applied to an actual process.

FIGS. 10 to 12 are arrays of screen views showing nozzle-specific CLP profiles and the graphs of nozzles' manipulated variables in the same type of control as that of FIG. 9. In these figures, a numeral 41 indicates a CLP profile, a numeral 42 indicates a manipulated variable, and the horizontal axis represents a nozzle number. Furthermore, FIG. 10 is an array of screen views before and after the start of control, FIG. 11 is an array of screen views 13 and 19 minutes after the start of control and FIG. 12 is an array of screen views 27 minutes after the start of control and when control is stabilzed. Note that the graphs of the last screen view when control is stabilzed are the results obtained 52 minutes after the start of control.

As can be understood from FIG. 10, among the above-mentioned figures, which shows the screen views before and immediately after the start of control, manipulated variables of a significant number of nozzles are seen to overshoot toward either the 0% side or 100% side. On the other hand, in the case of the graphs 19 minutes after the start of control shown in FIG. 11, the value of R which is the deviation between the maxium and minimum values of the CLP profile is 1.9, i.e., smaller than 2.0. When control is stabilized, R is decreased back to as small as 0.5.

Figure 13:
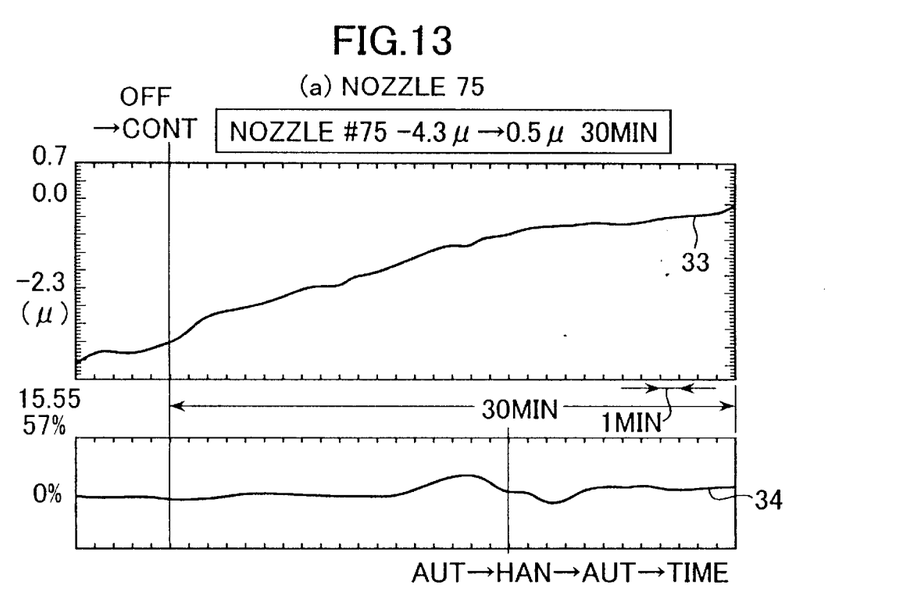
FIG. 13 is a graphical view showing the characteristics of prior art sampling PI control.

FIG. 13 shows trend graphs representing nozzle-specific CLP profiles and the manipulated variables of respective nozzles in conventional PI control. These graphs are shown for the purpose of contrast with those of FIG. 9. In FIG. 13, graph a shows the plots of nozzle 75, graph b shows the plots of nozzle 80, a numeral 33 denotes a CLP process variable, and a numeral 34 denotes a manipulated variable. This figure shows the problem that the CLP process variable takes as long as 23 to 30 minutes to settle within a deviation of 0.5 $\mu$m. Furthermore, the manipulated variable varies in a very gentle manner. Accordingly, it is understood that the control method of FIG. 13 is significantly inferior to that of FIG. 9.

Although the present invention has been applied to profile control in the cross-machine direction of a paper machine in the above-described embodiment, the invention is in no way limited to this type of control. The present invention can also be applied to other types of profile control in the cross-machine direction that uses actuators having a long dead time and a large time constant.

Furthermore, the present invention is also applicable to sampling control systems with a long dead time and a large time constant, in addition to systems for profile control in the cross-machine direction.

What is claimed is:

1. A method for controlling a processor by providing a deviation between a setpoint variable and a process variable to a controller to calculate a controlled manipulated variable and then providing said controlled/manipulated variable to said process, said method comprising the steps of:

determining conditions for said process variable to settle within a finite length of time from a final value theorem;

determining a transfer function of said controller from said conditions; and using said transfer function to calculate value or change of said controlled/manipulated variable within which to control said process; wherein said process has a dead time, a settling time, and a control period; and wherein an integer m is defined as a ratio of said dead time and said control period, and an integer k is defined as a value obtained by subtracting said integer m from a ratio of said setting time and said control period, whereby a latest value or change of a controlled/manipulated variable $W_n$ outputted by said contoller is calculated according to the following:

$$W_n = \frac{1}{K(1-\alpha^k)}[E_n - \alpha E_{n-1} - \alpha^k \{E_{n-k} - \alpha E_{n-(k+1)}\}] +$$
$$\alpha W_{n-1} - \alpha W_{n-2} + \frac{1-\alpha}{1-\alpha^k}\{W_{n-(m+1)} - \alpha^k W_{n-(m+k+1)}\}$$

where $E_n$, $E_{n-1}$, $E_{n-k}$ and $E_{n-(k+1)}$ are the values of said deviation in the current control period, in the previous control period, in the period k control periods earlier, and in the period k+1 control periods earlier, respectively, $W_{n-1}$, $W_{n-2}$, $W_{n-(m+1)}$ and $W_{n-(m+k+1)}$ are the values of said controlled/manipulated variable in the previous control period, in the period two control periods earlier, in the period m+1 control periods earlier, and in the period m+k+1 control periods earlier, respectively, and $\alpha$ and K are constants.

2. The method of claim 1, wherein $\Delta W_n$ outputted by said controller is calculated according to the following:

$$\Delta W_n = \frac{1}{K(1-\alpha^k)}$$
$$[E_n - (\alpha+1)E_{n-1} + \alpha E_{n-2} - \alpha^k\{E_{n-k} - (\alpha+1)E_{n-(k+1)} + \alpha E_{n-(k+2)}\}] +$$
$$\alpha \Delta W_{n-1} + \frac{1-\alpha}{1-\alpha^k}\{\Delta W_{n-(m+1)} - \alpha^k \Delta W_{n-(m+k+1)}\}$$

where $E_n$, $E_{n-1}$, $E_{n-2}$, $E_{n-k}$, $E_{n-(k+1)}$ and $E_{n-(k+2)}$ are the values of said deviation in the current control period, in the previous control period, in the period two control periods earlier, in the period k control periods earlier, in the period k+1 control periods earlier, and in the period k+2 control periods earlier, respectively, $\Delta W_{n-1}$, $\Delta W_{n-(m+1)}$ and $\Delta W_{n-(m+k+1)}$ are changes in said controlled/manipulated variable in the previous control period, in the period m+1 control periods earlier, and in the period m+k+1 control periods earlier, respectively, and $\alpha$ and K are constants.

3. The method of claim 1, wherein $\Delta W_n$ outputted by said controller is calculated according to the following:

$$\Delta W_n = \frac{1}{K(1-\alpha^k)}[E_n - (\alpha+1)\{E_{n-1} - K(1-\alpha^k)\Delta W_{n-1}^b\} +$$

$$\alpha\{E_{n-2} - K(1-\alpha^k)\Delta W_{n-2}^b\}] - \frac{\alpha^k}{K(1-\alpha^k)}$$

$$[\{E_{n-k} - K(1-\alpha^k)\Delta W_{n-k}^b\} - (\alpha+1)\{E_{n-(k+1)} - K(1-\alpha^k)\Delta W_{n-(k+1)}^b\} +$$

$$\alpha\{E_{n-(k+2)} - K(1-\alpha^k)\Delta W_{n-(k+2)}^b\}] +$$

$$\alpha\Delta W_{n-1}^a + \frac{1-\alpha}{1-\alpha^k}\{\Delta W_{n-(m+1)}^a - \alpha^k \Delta W_{n-(m+k+1)}^a\}$$

where $E_n$, $E_{n-1}$, $E_{n-2}$, $E_{n-k}$, $E_{n-(k+1)}$ and $E_{n-(k+2)}$ and are the values of said deviation in the current control period, in the previous control period, in the period two control periods earlier, in the period k control periods earlier, in the period k+1 control periods earlier, and in the period k+2 control periods earlier, respectively, and $\alpha$ and K are constants, and L is defined as the upper limit of manipulation that can be output by said controller, whereby $\Delta w_n^a$ and $\Delta w_n^b$ are given by $\Delta w_n^a = L - W_n$ (if $W_n + \Delta W_n \leq L$); or $\Delta w_n^a = \Delta W_n$ (if $W_n + \Delta W_n \leq L$); and $\Delta w_n^b = \Delta W_n - (L - W_n)$ (if $W_n + \Delta W_n > L$); or $\Delta w_n^b = 0$ (if $W_n + \Delta W_n \leq L$); respectively, where $\Delta w_{n-i}^a$ and $\Delta w_{n-i}^b$ are changes in said controlled/manipulated variable in the period i control periods earlier.

4. The method of claim 1, wherein a time constant of said process is defined as $T_o$, sampling time thereof is defined as T, and value of k is set so as to satisfy the following:

$k \times T > t_o/2$.

5. A method for controlling a process involving a long dead time and a large time constant by providing a deviation between a setpoint variable and a process variable to a controller to calculate a controlled variable and a manipulated variable, and then providing said controlled variable and said manipulated variable to said process, said method comprising the steps of:

determining conditions for a control variable to settle within a finite length of time from a final value theorem;

determining a transfer function of said controller from said conditions; and using said transfer function to provide a manipulated variable to be concurrent with the controlled variable within a short length of time so as to control more quickly said process.

6. The method of claim 5, wherein said method is applied to control profile in a cross direction of a sheet being produced.

7. The method of claim 5, comprising the further steps of:

correcting a deviation variable to be provided to said transfer function by using a value related to amount of change in said controlled variable and manipulated variable that could not be outputted in a previous control period and in an earlier control period.

8. A process control apparatus for controlling a process by providing a deviation between a setpoint variable and a process variable to a controller to calculate a controlled variable and a manipulated variable, and the providing said controlled variable and said manipulated variable to said process, said apparatus comprising:

means for determining conditions for a process variable to settle within a finite length of time from a final value theorem;

means for determining a transfer function of said controller from said conditions; and means for calculating value or change in said manipulated variable to be concurrent to said controlled variable using said transfer function within a short length of time so as to control more quickly said process, and wherein said controlled variable and said manipulated variable are used to control said process.

9. The apparatus of claim 8, further comprising means for controlling profile in a cross direction of a sheet being produced.

10. The apparatus of claim 8, further comprising means for correcting a deviation variable to be provided to said transfer function by using a value related to amount of change in said controlled variable and manipulated variable that could not be outputted in a previous control period and in an earlier control period.

* * * * *